United States Patent [19]

Mehta et al.

[11] Patent Number: 5,782,602

[45] Date of Patent: Jul. 21, 1998

[54] DEVICE FOR LOADING AND UNLOADING PALLETS

[75] Inventors: Zersis M. Mehta, Hialeah, Fla.; Robert M. Stone, Tucson, Ariz.

[73] Assignee: ECOA Hydraulic Lifts, Inc., Hialeah, Fla.

[21] Appl. No.: 591,362

[22] Filed: Jan. 25, 1996

Related U.S. Application Data

[63] Continuation-in-part of Ser. No. 267,443, Jun. 28, 1994, Pat. No. 5,490,758, which is a continuation-in-part of Ser. No. 14,344, Jan. 5, 1993, abandoned, which is a continuation-in-part of Ser. No. 695,692, May 3, 1991, Pat. No. 5,299,906.

[51] Int. Cl.$^6$ ............................................. B66B 7/00
[52] U.S. Cl. ............................................. 414/672; 187/253
[58] Field of Search ............................... 414/672, 665, 414/669, 607, 792.3, 792.2; 187/253, 215, 234, 223, 300; 104/47, 45

[56] References Cited

U.S. PATENT DOCUMENTS

| | | | |
|---|---|---|---|
| 1,978,170 | 10/1934 | Roesner | 187/234 X |
| 2,699,878 | 1/1955 | Avery | 414/607 X |
| 4,755,099 | 7/1988 | Beleal | 414/665 X |
| 5,299,906 | 4/1994 | Stone | 414/792.3 |
| 5,490,758 | 2/1996 | Stone | 414/792.3 |
| 5,503,247 | 4/1996 | MacLeod | 187/253 X |
| 5,653,568 | 8/1997 | Josephs | 414/545 X |

FOREIGN PATENT DOCUMENTS 551148  1/1958  Canada ........................... 187/234

*Primary Examiner*—David H. Bollinger
*Attorney, Agent, or Firm*—Antonio R. Durando

[57] ABSTRACT

A device for stacking and unstacking loads has a base made up of an upright housing and a pair of spaced, parallel outriggers extending from the housing. Vertical guide rods are mounted on the exterior of the housing, and a platform assembly is movable up-and-down on the guide rods. In its lowermost position, the platform assembly sits on the ground between the outriggers. The platform assembly comprises a carrier, a platform on the carrier having a circular opening, a turntable mounted on the carrier within the opening, and a braking system for the turntable. The platform is movable up-and-down with respect to the turntable. When the platform assembly is in a raised position, the platform is located below the turntable and the braking system is disengaged. The platform rises to the level of the turntable, and the braking system engages, in response to arrival of the platform assembly at ground level. The platform automatically sinks below the turntable, and the braking system is automatically disengaged, as the platform assembly is raised. The platform assembly is driven by a cylinder-and-piston unit which is disposed inside the housing and engages the periphery of the assembly through a slot in a wall of the housing. The cylinder-and-piston unit is extended and retracted by a power unit consisting of a motor, pump and tank likewise disposed inside the housing.

20 Claims, 8 Drawing Sheets

5,782,602

DEVICE FOR LOADING AND UNLOADING PALLETS

CROSS-REFERENCE TO RELATED APPLICATIONS

This application is a continuation-in-part of U.S. application Ser. No. 08/267,443, filed Jun. 28, 1994, now U.S. Pat. No. 5,490,758, entitled "Pit-Mounted Load Elevator", which is a continuation-in-part of U.S. application Ser. No. 08/014,344, filed Jan. 5, 1993, now abandoned, entitled "Pit-Mounted Load Elevator", which is a continuation-in-part of U.S. application Ser. No. 07/695,692, filed May 3, 1991, entitled "Self-Adjusting Pneumatic Load Elevator", now issued as U.S. Pat. No. 5,299,906, hereby incorporated by reference.

BACKGROUND OF THE INVENTION

1. Field of the Invention

The invention relates to a device for use in stacking and unstacking loads.

2. Description of the Prior Art

The copending U.S. patent application Ser. No. 08/267,443 discloses a load elevator which is supported by a scissors linkage located underneath the elevator. In the unloaded condition, the scissors linkage is extended and the elevator is situated at a convenient level for loading the elevator. A pallet is placed on the elevator and boxes or crates are stacked on the pallet. As the pallet is loaded and the height of the stack on the pallet increases, the scissors linkage automatically contracts and the elevator sinks approximately in proportion to the height increase of the stack. In this way, the top of the stack is maintained at a roughly constant level so that stacking is facilitated.

When the pallet is fully loaded, it is removed from the elevator by a pallet truck. At this time, the elevator is in its lowest position. In order to simplify removal of the loaded pallet from the elevator, the top of the elevator should be at or near ground level. To this end, the elevator is mounted over a pit which can receive the scissors linkage in the lowermost position of the elevator.

Although the above load elevator operates satisfactorily, the pit increases costs and also poses a potential hazard. Furthermore, the need for a pit prevents the elevator from being readily relocated.

SUMMARY OF THE INVENTION

It is an object of the invention to provide a stacking and unstacking device which can operate satisfactorily without a pit.

Another object of the invention is to provide a stacking and unstacking device which can be easily relocated and yet operate successfully.

The preceding objects, as well as others which will become apparent as the description proceeds, are achieved by the invention.

One aspect of the invention resides in a stacking and unstacking device which comprises a base, and a platform assembly including a carrier, a first platform mounted for rotation on the carrier, and a second platform on the carrier at least partly framing the first platform. The first and second platforms are relatively movable between an aligned condition in which the first and second platforms are at substantially the same height and a non-aligned condition in which the second platform is lower than the first platform. The platform assembly further includes a braking mechanism which is arranged to arrest the first platform in the aligned condition of the first and second platforms. The stacking and unstacking device additionally comprises a drive on the base for moving the platform assembly between a raised position in which the first and second platforms are in the non-aligned condition and a lowered position in which the first and second platforms are in the aligned condition. The drive is located laterally of the platform assembly substantially in its entirety.

In accordance with the invention, the drive for raising and lowering the platform assembly is arranged so that no substantial part of the drive is underneath the platform assembly. This makes it possible for the platform assembly to descend to, or virtually to, ground level without a pit. Since no pit is required, the stacking and unstacking device of the invention can be relocated as desired.

Additional features and advantages of the invention will be forthcoming from the following detailed description of preferred embodiments when read in conjunction with the accompanying drawings.

DESCRIPTION OF THE PREFERRED EMBODIMENTS

Figure 1:
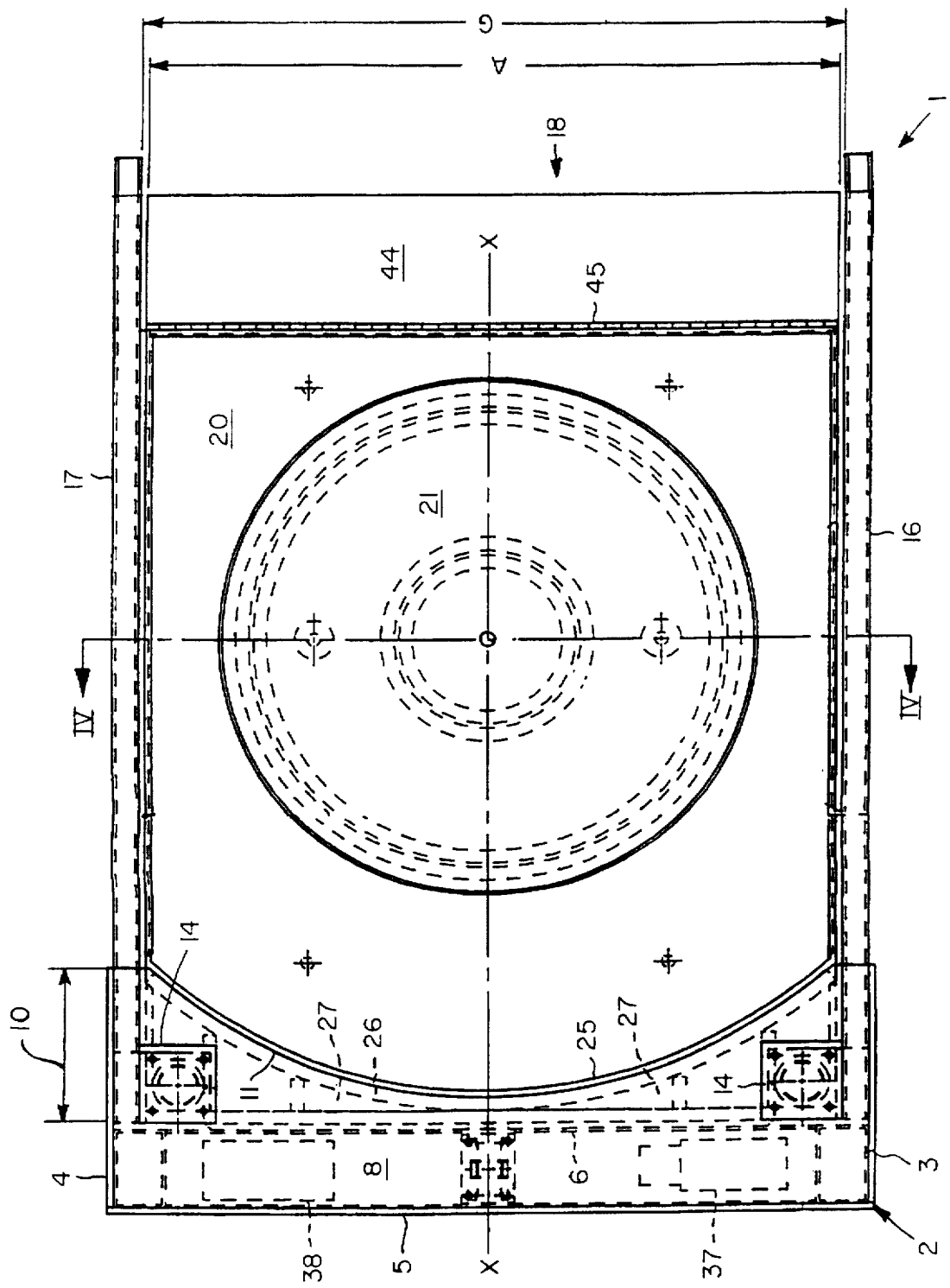
FIG. 1 is a plan view of a stacking and unstacking device according to the invention.

Considering FIGS. 1–3 and 6, the numeral 1 generally identifies a stacking and unstacking device in accordance with the invention. The stacking and unstacking device 1 can also be referred to as a stacker and, for the sake of brevity, the term stacker will be used in the following description.

The stacker 1 includes an upright or upstanding support 2 which extends transversely of the stacker 1. The support 2 comprises a pair of opposed side walls 3 and 4, a rear wall 5, a front wall 6, a bottom wall 7 and a top wall 8. The walls 3,4,5,6,7,8, which are flat and can be made of plate, cooperate to define a housing 9. The side walls 3,4 extend vertically in parallelism with one another as do the rear wall 5 and front wall 6. On the other hand, the bottom wall 7 and top wall 8 extend horizontally in parallelism with one another. The side walls 3,4 are perpendicular to the rear wall 5, front wall 6, bottom wall 7 and top wall 8. The bottom wall 7 and top wall 8 are situated to the front of the rear wall 5 and between the side walls 3,4 so that the side walls 3,4 and rear wall 5 embrace the bottom wall 7 and top wall 8. The front wall 6 sits on the bottom wall 7 and terminates at or slightly below the top wall 8.

The side walls 3,4, rear wall 5 and front wall 6 are generally rectangular. The side walls 3,4 project beyond the front wall 6 and have straight, vertical front edges. The top wall 8 likewise projects beyond the front wall 6 to form an overhang 10. The lateral edges of the top wall 8 are straight and parallel to each other and the side walls 3,4 while the rear edge of the top wall 8 is straight and perpendicular to the lateral edges thereof. In contrast, the front edge 11 of the top wall 8 is curved and concave so that the overhang 10 is narrower at the middle than at the sides. Each of the wider portions of the overhang 10 is provided with an opening near but spaced from the respective side wall 3 or 4.

The bottom wall 7 consists of a generally rectangular portion having two extensions 12 which are respectively located below the wider portions of the overhang 10. Each of the extensions 12 constitutes a mounting pad for a vertical guide rod 13 which is aligned with a respective opening in the overhang 10. The guide rods 13 are held in position by plates 14 which overlie the openings in the overhang 10 and are secured to the latter by bolts 15 or other suitable fasteners.

An outrigger or leg 16 is affixed to that portion of the side wall 3 which projects to the front of the front wall 6. A second outrigger or leg 17 is affixed to that portion of the side wall 4 which projects to the front of the front wall 6. The outriggers 16,17 can, for instance, be bolted to the side walls 3,4. The outriggers 16,17 extend longitudinally of the stacker 1 forwardly of the support 2. The outriggers 16,17 are parallel to and oppose one another, and the outriggers 16,17 are separated from each other by a gap G. The outriggers 16,17 are disposed at the lower end of the support 2 and, together with the support 2, constitute a base of the stacker 1. The bottom surfaces of the outriggers 16,17 are flush with the bottom surface of the bottom wall 7, as well as with the bottom edges of the side walls 3,4 and rear wall 5, so that the base 2,16,17 can rest firmly on the ground.

A platform assembly 18 is movable up-and-down on the guide rods 13. The platform assembly 18 extends forwards from the guide rods 13 and terminates in the region of the free ends of the outriggers 16,17, i.e., the ends of the outriggers 16,17 remote from the support 2. The platform assembly 18 has a width A slightly smaller than the gap G between the outriggers 16,17 so that the platform assembly 18 can fit between the outriggers 16,17.

Figure 4:
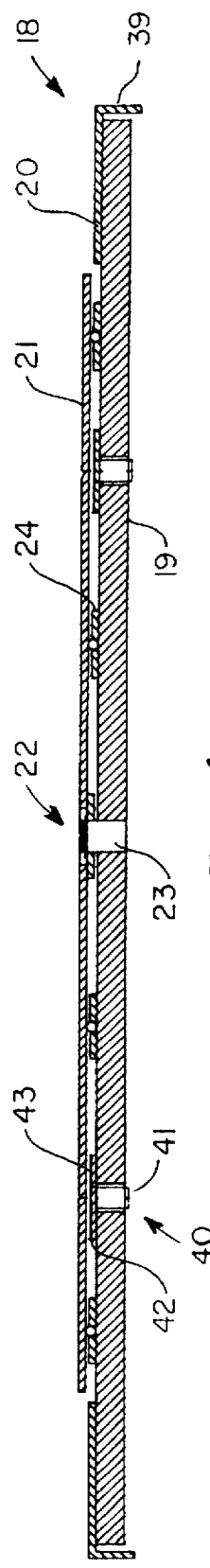
FIG. 4 is a sectional view, as seen in the direction of the arrows IV—IV of FIG. 1, of a platform assembly constituting part of the device of FIG. 1 in one of a plurality of positions of the platform assembly.
Figure 5:
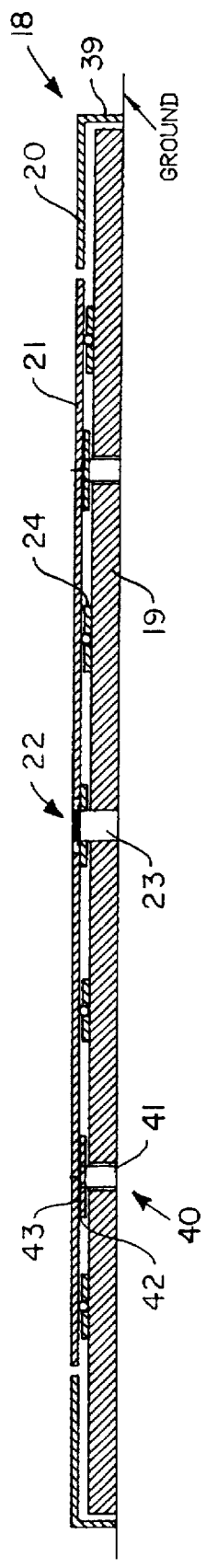
FIG. 5 is similar to FIG. 4 but shows the platform assembly in another position.
Figure 4A:
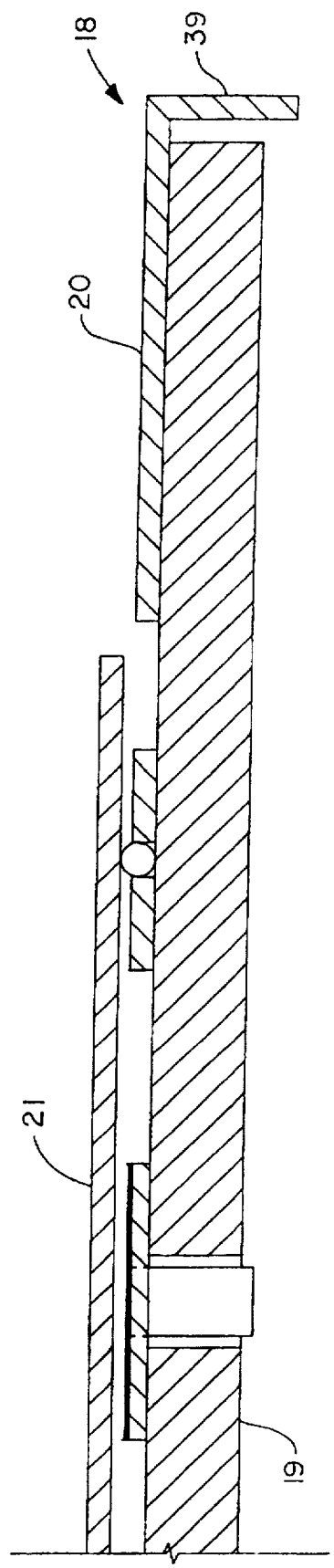
FIGS. 4a and 4b are enlarged, partial views of the platform assembly of FIG. 4.
Figure 4B:
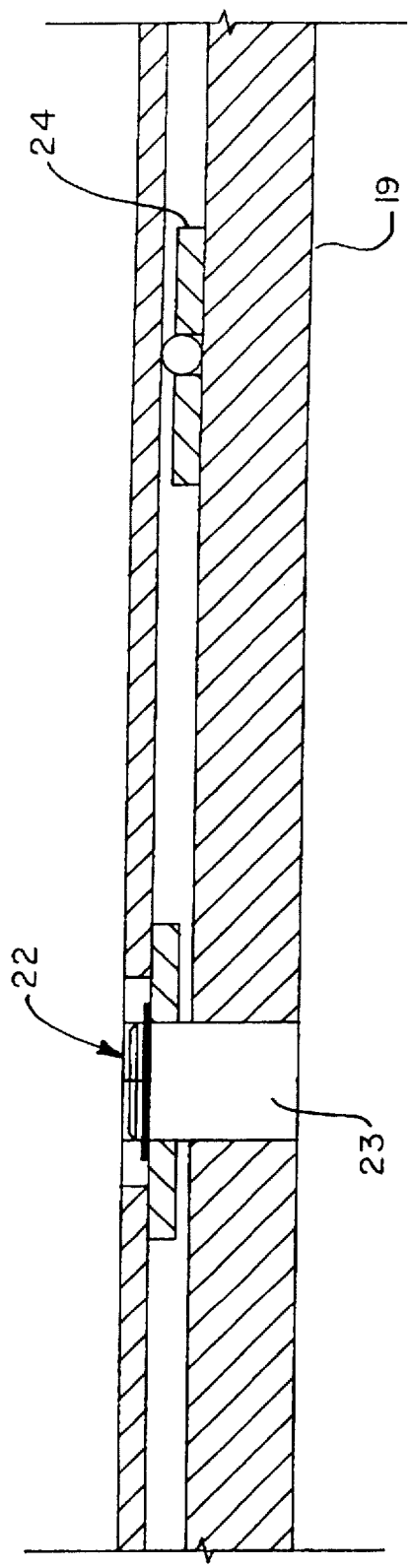
Figure 5A:
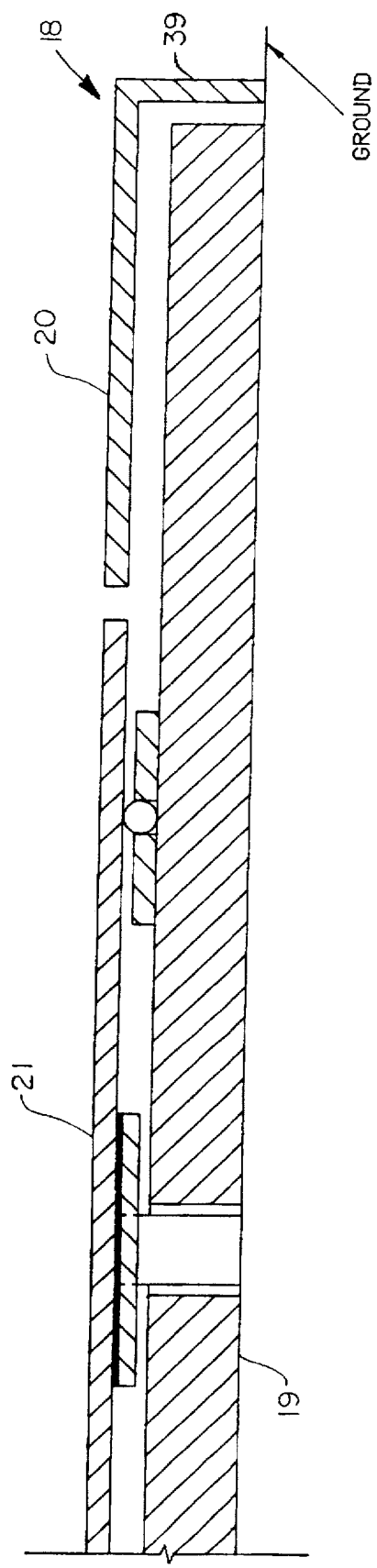
FIG. 5a is an enlarged, partial view of the platform assembly of FIG. 5.

As best seen in FIGS. 4 and 5, and in the corresponding enlarged, partial views of FIGS. 4a, 4b and 5a, the platform assembly 18 includes a carrier or main platform 19 and an auxiliary platform 20 which is mounted on the carrier 19 and is provided with a circular opening. A turntable or rotary platform 21 is mounted on the carrier 19 within the circular opening so that the auxiliary platform 20 circumscribes the turntable 21. The center of the turntable 21 is equipped with a mounting assembly 22, and the mounting assembly 22 comprises a depending shaft 23 which is journalled in the carrier 19. The turntable 21 defines a gap with the carrier 19 and ball bearings 24 are located in the gap. The ball bearings 24 are secured to the carrier 19, and the turntable 21 rides on the ball bearings 24. The ball bearings 24 are preferably uniformly distributed radially and circumferentially of the turntable 21.

Referring back to FIGS. 1–3, the auxiliary platform 20 has a curved, convex rear edge 25 which is parallel to, and is disposed slightly to the front of, the concave front edge 11 of the top wall 8. The carrier 19 projects rearwardly of the auxiliary platform 20, and the rearwardly projecting portion of the carrier 19 is provided with an upright or upstanding rim 26. The rim 26 is in the form of an arc, and the rim 26 follows the contour of and extends along the convex rear edge 25 of the auxiliary platform 20.

The stacker 1 has a longitudinal center plane X—X which bisects the platform assembly 18 longitudinally. A lip 27 extends rearward from the upper edge of the rim 26 on either side of the plane X—X. The lips 27 are roughly triangular, and each of the lips 27 has a concave edge fast with the rim 26 and a pair of straight edges which are respectively parallel to the front wall 6 and the side walls 3,4. The straight edges of the lips 27 intersect one another at right angles near the corners defined by the front wall 6 and the forwardly projecting portions of the side walls 3,4. An upright or upstanding bearing sleeve 28 projects upwards from each lip 27 adjacent the intersection of the respective straight edges. A vertical bearing passage extends through each bearing sleeve 28 and lip 27, and the bearing passages slidably receive respective ones of the guide rods 13. The guide rods 13 thus guide the platform assembly 18 for up-and-down movement on the support 2.

A vertical cylinder-and-piston unit 29 is mounted on the bottom wall 7 inside the housing 9 of the support 2. The cylinder-and-piston unit 29 is bisected by the longitudinal center plane X—X, and the front wall 6 is provided with a vertical slot 30 directly in front of the cylinder-and-piston unit 29. The slot 30 extends virtually the entire height of the front wall 6. The cylinder-and-piston unit 29 includes an upright lifting cylinder 31 and a piston rod 32 which rides in the cylinder 31. The piston rod 32 has a free upper end which carries a bearing unit 33, and the bearing unit 33 rotatably supports a sprocket or sheave 34. The sprocket or sheave 34 is rotatable on an axis normal to the longitudinal center plane X—X. A chain 35 passes around the sprocket or sheave 34 and has an end to the rear of the cylinder-and-piston unit 29 and another end to the front of the cylinder-and-piston unit 29. The rear end of the chain 35 is fixed to the support 2 in the vicinity of the bottom wall 7.

Figure 2:
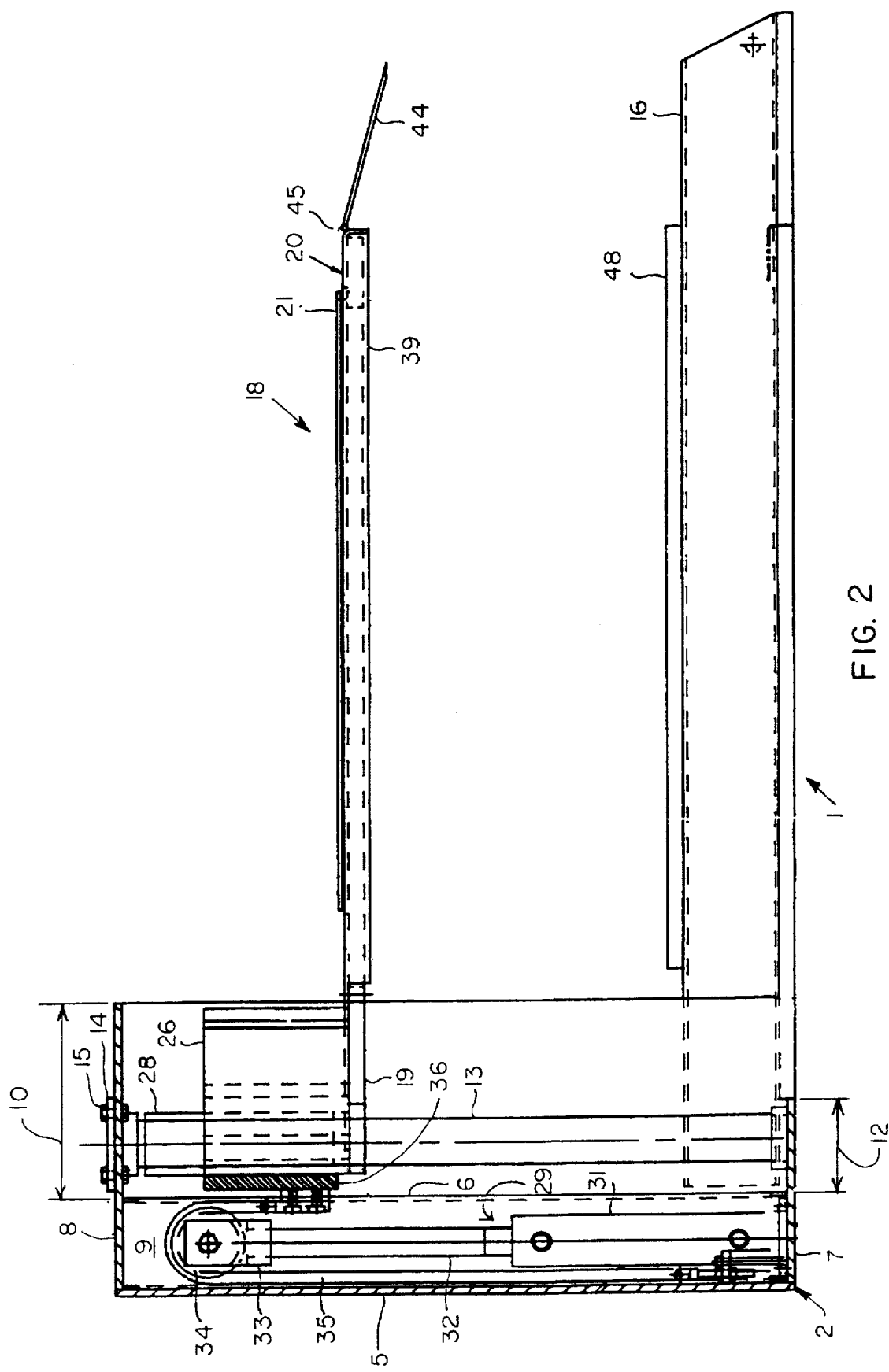
FIG. 2 is a partly sectional side view of the device of FIG. 1.
Figure 3:
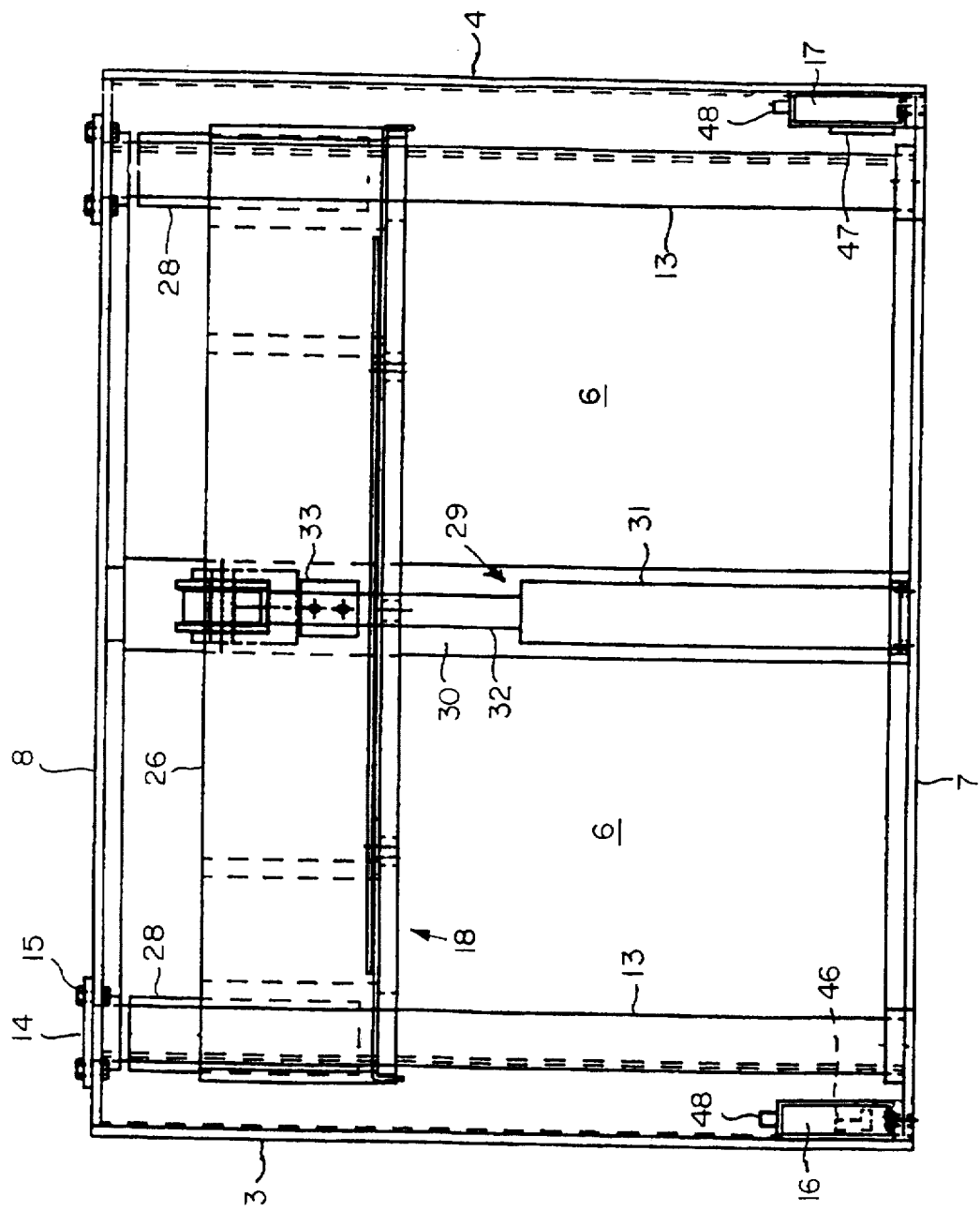
FIG. 3 is a front view of the device of FIG. 1.

A reinforcing block 36 is fixed to the rear surface of the rim 26 between the lips 27. The reinforcing block 36, which is bisected by the longitudinal center plane X—X, faces the slot 30 in the front wall 6. The front end of the chain 35 is secured to the reinforcing block 36. Consequently, the platform assembly 18 is raised as the piston rod 32 is extended and lowered as the piston rod 32 is retracted. FIGS. 2 and 3 show the platform assembly 18 in its fully raised position.

The cylinder-and-piston unit 29 is preferably mounted on the bottom wall 7 and it is driven by a power unit 37 inside the housing 9 (FIG. 1). The power unit 37 includes an assembly of a motor, a pump and a tank. The power unit 37 is controlled by way of a control box 38 which is likewise mounted inside the housing 9.

The cylinder-and-piston unit 29 and power unit 37 together constitute a drive for the platform assembly 18. All components of the drive 29,37 are disposed laterally of the platform assembly 18 within the housing 9. The drive 29,37 and platform assembly 18 are designed such that the platform assembly 18 moves only under the action of the drive 29,37 and not in response to loading or unloading of the platform assembly 18. Within design specifications, the platform assembly 18 can be brought to and held at any elevation by the drive 29,37 regardless of the load on the platform assembly 18.

Turning once more to FIGS. 4, 4a, 5 and 5a, the sides and front end of the auxiliary platform 20 project beyond the carrier 19. The auxiliary platform 20 is provided with a skirt 39 which extends along the sides and across the front end of the auxiliary platform 20 and around the carrier 19. As can be seen from a comparison of FIGS. 4 and 5, the auxiliary platform 20 is movable up-and-down relative to the carrier 19 and the turntable 21, and the skirt 39 serves to regulate such movement.

In the raised position of the platform assembly 18 corresponding to FIG. 4, the auxiliary platform 20 rests on the carrier 19 and the skirt 39 projects below the carrier 19. The auxiliary platform 20 is at a lower height than the turntable 21 so that the auxiliary platform 20 and the turntable 21 are out of alignment.

When the platform assembly 18 is lowered, the skirt 39 contacts the ground before the carrier 19. As the carrier 19 continues to descend, the auxiliary platform 20 remains stationary so that the turntable 21 moves downward relative to the auxiliary platform 20. The height of the skirt 39 is selected in such a manner that, once the carrier 19 reaches the fully lowered position in which the carrier 19 contacts the ground, the auxiliary platform 20 and the turntable 21 are at the same height. FIG. 5 corresponds to the fully lowered position of the platform assembly 18 and illustrates that the auxiliary platform 20 and the turntable 21 are in alignment.

The carrier 19 is provided with brakes 40 for preventing rotation of the turntable 21 in the fully lowered position of the platform assembly 18. Each of the brakes 40 includes a vertical shaft 41 which is slidably received in a vertical passage extending through the carrier 19. The upper ends of the shafts 41 carry horizontal mounting plates 42 which are located in the gap between the turntable 21 and the carrier 19. A brake pad 43 overlies the upper surface of each mounting plate 42. The brakes 40 are preferably uniformly distributed radially and circumferentially of the turntable 21.

In the raised position of the platform assembly 18 corresponding to FIG. 4, the mounting plates 42 rest on, and the shafts 41 project below, the carrier 19. The brake pads 43 are spaced from the turntable 21 so that the latter is free to rotate.

When the platform assembly 18 is lowered, the shafts 41 contact the ground before the carrier 19. As the carrier 19 continues to descend, the brakes 40 remain in place so that the turntable 21 moves downward relative to the brakes 40. The lengths of the shafts 41 are selected in such a manner that, once the carrier 19 is in its fully lowered position, the brake pads 43 firmly engage the turntable 21 and prevent the same from rotating.

Considering again FIGS. 1–3 and 6, a ramp 44 is pivotally mounted on the front end of the auxiliary platform 20 by means of a hinge 45. The free front edge of the ramp 44 contacts the ground in the fully lowered position of the platform assembly 18 so that a vehicle, e.g., a pallet truck, can roll onto the auxiliary platform 20.

A photoelectric switch 46 (FIG. 3) is mounted on the free end of the outrigger 16, i.e., the end of the outrigger 16 remote from the support 2. A reflector 47 is mounted on the free end of the outrigger 17 directly across from the photoelectric switch 46. The photoelectric switch 46 generates a beam of electromagnetic radiation which travels to the reflector 47 and is reflected back to a sensor constituting part of the photoelectric switch 46. If the platform assembly 18 is in a raised position and the beam is interrupted by an object, e.g., the foot of an operator, the photoelectric switch 46 prevents the platform assembly 18 from returning to its fully lowered position. Thus, the photoelectric switch 46 shuts off the drive 29,37 for the platform assembly 18.

Figure 6:
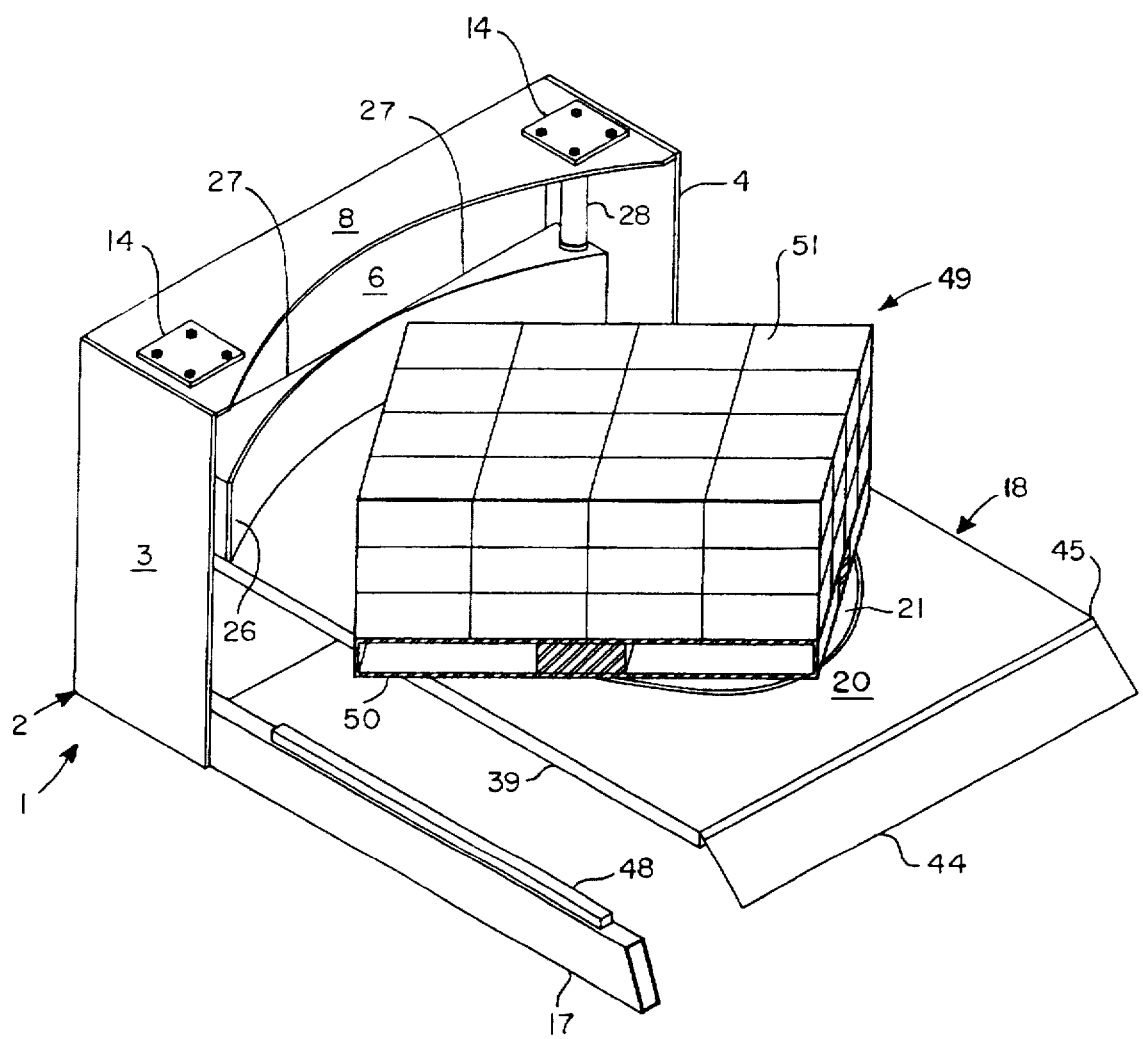
FIG. 6 is a perspective view of the device of FIG. 1 with a load.

FIG. 6 shows the platform assembly 18 with a load 49 consisting of a pallet 50 which supports several layers of boxes 51. A tape switch 48 is located on top of each outrigger 16,17 and runs longitudinally along the major part of the length of the respective outrigger 16,17. When the platform assembly 18 is lowered and the load 49 is off-center as illustrated so that it strikes one of the tape switches 48, such tape switch 48 will prevent the platform assembly 18 from descending to its fully lowered position. Upon being struck by the load 49, the tape switches 48 shut off the drive 29,37 for the platform assembly 18. This avoids tipping and possible spilling of the load 49.

The operation of the stacker 1 will be described assuming that the platform assembly 18 is to be loaded with boxes by an operator. It is further assumed that an empty pallet has been placed on the turntable 21 and that the platform assembly 18 has been raised to a height at which the operator can comfortably place boxes on the pallet.

Since the platform assembly 18 is in a raised position, the auxiliary platform 20 sits below the turntable 21 and the brakes 40 are disengaged. Accordingly, the turntable 21 can rotate freely.

The operator initially loads a first layer of boxes on the pallet. To this end, the operator places boxes on those areas of the pallet which are accessible to the operator without leaving his or her post and without leaning over unduly. Once boxes have been placed on such areas of the pallet, the operator rotates the turntable 21 so that unoccupied areas of the pallet become readily accessible. The operations of placing boxes on the pallet and rotating the turntable 21 are repeated until a first layer of boxes covers the pallet.

The platform assembly 18 is now lowered by a distance approximately equal to the height of the boxes. This brings the upper surface of the first layer of boxes to about the same level previously occupied by the upper surface of the pallet. A second layer of boxes is thereupon stacked on the first layer in the same manner as before.

The operations of lowering the platform assembly 18 and loading a layer of boxes are repeated until the desired number of boxes has been stacked on the pallet. The platform assembly 18 is then brought to its lowermost position. In response to arrival of the platform assembly 18 at its lowermost position, the auxiliary platform 20 becomes level with the turntable 21 and the turntable 21 is braked. A pallet truck is now moved up the ramp 44 onto the auxiliary platform 20 to remove the loaded pallet from the stacker 1.

While the platform assembly 18 is in its lowermost position, another pallet containing layers of boxes to be unstacked can be deposited on the turntable 21 by a pallet truck. Following deposition of the new pallet on the turntable 21, the platform assembly 18 is raised to a height at which the operator can comfortably remove boxes from the top layer. In response to elevation of the platform assembly 18, the auxiliary platform 20 sinks below, and the brakes 40 are disengaged from, the turntable 21.

The operator first removes those boxes of the top layer which are accessible to the operator without leaving his or her post and without leaning over unduly. Once such boxes have been removed, the operator rotates the turntable 21 so that other boxes of the top layer become readily accessible. The operations of removing boxes from the top layer and rotating the turntable 21 are repeated until all boxes of the top layer have been unloaded.

The platform assembly 18 is now raised by a distance approximately equal to the height of the boxes. This brings the second-from-the-top layer of boxes to about the same level previously occupied by the top layer. The second-from-the-top layer of boxes is thereupon unloaded in the same manner as before.

The procedure of raising the platform assembly 18 and unloading a layer of boxes is repeated until the pallet is empty. The empty pallet can then be removed from the turntable 21 or loaded once again.

The placement of all components of the drive 29,37 for the platform assembly 18 laterally of the latter permits the platform assembly 18 to be lowered to ground level without a pit. This makes it possible to reduce costs and to readily relocate the stacker 1.

The automatic alignment of the auxiliary platform 20 with the turntable 21 when the platform assembly 18 reaches ground level enables a vehicle to be moved along the platform assembly 18 without being jarred by discontinuities. On the other hand, the ramp 44 allows smooth movement of a vehicle onto the platform assembly 18. The automatic braking of the turntable 21 at ground level permits a vehicle to move onto the platform assembly 18 safely.

The automatic disengagement of the brakes 40 upon raising the platform assembly 18, in conjunction with the automatic descent of the auxiliary platform 20 below the turntable 21, enables the turntable 21 to rotate freely. Consequently, the platform assembly 18 can be loaded and unloaded easily and an operator does not have to go around the stacker 1 in order to load or unload the platform assembly 18.

The photoelectric switch 46 constitutes a safety feature and prevents the platform assembly 18 from descending onto the foot of an operator. Similarly, the tape switches 48, which stop descent of the platform assembly 18 when a load is off-center, prevent accidents which could occur if a load tilted and spilled.

Various modifications are possible within the meaning and range of equivalence of the appended claims.

We claim:

1. A device for supporting a stack during stacking and unstacking comprising:
   (a) a base;
   (b) a platform assembly including a carrier, a first platform mounted for rotation on said carrier, and a second platform on said carrier at least partly framing said first platform; and
   (c) a drive for moving said platform assembly between a raised position and a lowered position, said drive being located laterally of said platform assembly substantially in its entirety, and said platform assembly further including means for causing relative movement of said first and second platforms from a first condition to a second condition when said platform assembly is moved from said raised position to said lowered position, said first condition being a non-aligned condition in which said second platform is lower than said first platform, and said second condition being an aligned condition in which said first and second platforms are at substantially the same height, said platform assembly additionally including a braking mechanism which is arranged to arrest said first platform in said second condition.

2. The device of claim 1, wherein said platform assembly has a periphery and said drive engages said platform assembly in the region of said periphery only.

3. The device of claim 2, wherein said carrier has an upstanding rim at said periphery and said drive engages said rim.

4. The device of claim 1, wherein said drive comprises a cylinder-and-piston unit, a sheave or sprocket mounted on the piston of said cylinder-and-piston unit, and a chain passing over said sheave or sprocket, said chain having a first end which is connected to said base and a second end which is connected to said platform assembly.

5. The device of claim 1, wherein said platform assembly has a passage; and further comprising a guide rod for guiding said platform assembly, said guide rod being fixed to said base and extending through said passage.

6. The device of claim 5, wherein said platform assembly is provided with a bearing sleeve and said passage extends through said bearing sleeve.

7. The device of claim 1, wherein said base includes an upstanding support having a lower end portion and opposite sides, said base further including a generally horizontal leg at each of said sides, and said legs extending from said lower end portion opposite and in substantial parallelism with one another, said support and said legs defining a receiving space which accommodates said platform assembly in said lowered position.

8. The device of claim 7, further comprising a sensor on at least one of said legs for detecting off-center loads.

9. The device of claim 8, wherein said sensor comprises a switch for deactivating said drive in response to detection of an off-center load.

10. The device of claim 9, wherein said switch comprises a tape switch which extends along said one leg.

11. The device of claim 7, wherein said support comprises a housing which accommodates at least part of said drive.

12. The device of claim 7, wherein each of said legs has an end remote from said support and said ends are spaced from one another by a gap; and further comprising a sensor for detecting objects in said gap.

13. The device of claim 12, wherein said sensor comprises a switch for deactivating said drive in response to detection of an object in said gap.

14. The device of claim 13, wherein said switch comprises a photoelectric switch.

15. The device of claim 1, wherein said platform assembly comprises a ramp having a first end which is connected to said second platform and a free second end which is remote from said second platform, said second end being arranged to contact the ground in said lowered position of said platform assembly to permit ascent of vehicles onto said platform assembly.

16. The device of claim 1, wherein said platform assembly comprises means for fixing said first platform against vertical movement relative to said carrier, said second platform being vertically movable relative to said carrier.

17. The device of claim 16, wherein said means for causing relative movement comprises a depending skirt on said second platform which projects below said carrier in said raised position of said platform assembly, said skirt being arranged to contact the ground, and thereby raise said second platform to a position of alignment with said first platform, in response to approach of said platform assembly to said lowered position thereof.

18. The device of claim 1, wherein said platform assembly comprises a plurality of ball bearings on said carrier supporting said first platform for rotation.

19. The device of claim 1, wherein said platform assembly further includes a braking mechanism which is arranged to arrest said first platform in said aligned condition.

20. The device of claim 19, wherein said carrier is provided with a substantially vertical passage and said braking mechanism includes a shaft slidably mounted in said passage, said shaft having a first end which faces said first platform and a second end which is remote from said first platform and projects below said carrier in said raised position of said platform assembly, said braking mechanism further including a brake pad which is mounted on said first end and is spaced below said first platform in said raised position of said platform assembly, and said second end being arranged to contact the ground, and thereby raise said brake pad into engagement with said first platform, in response to approach of said platform assembly to said lowered position.

* * * * *